June 24, 1969    E. M. MYERS ET AL    3,452,278
APPARATUS FOR ELECTRICAL WAVEFORM ANALYSIS
Filed March 3, 1967    Sheet 1 of 4

FIG.1

INVENTORS:
ELDRED M. MYERS,
PHILIP G. SCHULS,
BY C. W. Baker
THEIR ATTORNEY.

FIG. 6
GROSS TIMING CHART

United States Patent Office 3,452,278
Patented June 24, 1969

3,452,278
APPARATUS FOR ELECTRICAL WAVEFORM ANALYSIS
Eldred M. Myers and Philip G. Schuls, Syracuse, N.Y., assignors to General Electric Company, a corporation of New York
Filed Mar. 3, 1967, Ser. No. 620,386
Int. Cl. G01r 23/16
U.S. Cl. 324—77                                      7 Claims

ABSTRACT OF THE DISCLOSURE

This application describes apparatus for performing electrical waveform analysis to obtain measurements of the magnitudes and times of occurrence of the highest of one or more amplitude peaks appearing in the waveform during a sampling period, these peaks being ranked for sequential measurement in descending order of their magnitude. The apparatus accomplishes these measurements automatically and without visual display or other monitoring by an operator, and provides its output in digital form if desired. It therefore is well adapted to serve as an interface device between a high speed serial analog processor and a digital computer, in which capacity it provides the data rate reduction and analog-to-digital conversion necessary to accommodate the output of the analog processor to the input of the digital computer.

Background of the invention

This invention relates generally to electrical waveform analysis and more specifically to apparatus for measuring the magnitudes of one or more amplitude peaks in the waveform under analysis and for determining the corresponding times of occurrence of these peaks during the waveform sampling period.

Waveform analyzers of the general type to which this invention relates find utility in such applications as the investigation of performance characteristics of electronic circuits and components, in radar and sonar signal processing wherein the relative magnitudes and occurrence times of amplitude peaks yield useful target information, and in a wide variety of other applications. The prior art includes a correspondingly wide variety of waveform analyzer designs, and while many of these perform satisfactorily they generally are characterized by an undesirably high degree of complexity or limitations of capability which detract from their utility particularly in such demanding applications as radar signal processing. Certain of these known analyzer devices require visual display or monitoring by an operator, for example, and others require external memory devices for processing any but repetitive waveforms. These and other limitations of conventional waveform analyzers are particularly troublesome in applications in which the analyzer is to serve as an interface device between some high speed serial analog processor such as a radar signal processor, and a digital computer to which the processor output is to be supplied for further analysis.

In this application the raw data is in analog form and if such input data is simply analog-to-digital converted the resulting data rate is so high as to require an undesirable complexity of computer and peripheral equipment. The waveform analyzer of this invention performs an amplitude and time analysis, automatically and in real time, even of input waveforms of this complexity, and in the process selects only the most useful information thereby reducing the data rate to an acceptable level. It then converts this data from analog form to a proper digital format for computer input. In other applications the information output of waveform analyzers in accordance with the invention may be left in the analog form if desired.

Summary of the invention

The waveform analyzers of this invention afford a versatility and adaptability to application such that they may take any of many different froms. Certain of these constitute preferred embodiments and will be described in detail hereinafter; others will be obvious to those skilled in the art on the basis of the descriptions given.

Briefly, the input signal waveform to be analyzed is applied to a peak detecting and hold circuit which selects during each waveform sampling period that amplitude peak having the greatest magnitude, derives a measure of the magnitude of this peak and transmits it to an analog memory where the measure may be sampled, preferably through an analog-to-digital converter, to thus provide as a digital output the desired measure of magnitude of the highest amplitude peak during the sampling period. The analog memory and peak hold circuits also transmit their respective outputs to a comparator, transmission of the peak hold output being made through a delay element providing a time delay corresponding in duration to the waveform sampling period. The comparator produces an output signal at the moment in time at which the greatest peak amplitude occurs and this signal together with another marking the beginning or end of each waveform sampling period may be used to control a clock pulse counter, to thus provide a digital measure of the time of occurrence of the peak. Where similar measures of amplitude and times of occurrence of lesser magnitude peaks also are desired, a plurality of measurement circuits each generally similar to that just described may be connected in cascade fashion such that each succeeding stage senses the magnitude and time of occurrence of the next smaller magnitude peak. To enable this, logic and control means are provided for inhibiting each succeeding stage against response to peaks for which measures were taken in the preceding stages.

Thus constructed and arranged, the waveform analyzer of this invention affords several significantly advantageous features among which are the following:

(1) The analyzer provides accurate measures of magnitude and occurrence time of amplitude peaks in the waveform under analysis, and provides these measures automatically and without need for visual display or monitoring of any sort by an operator.

(2) The waveform need only occur once for its amplitude and time characteristics to be measured, and the measurement is made in real time so no external memory or data storage is required.

(3) The analyzer provides measures of any selected number of the amplitude peaks of largest magnitude and ranks these peaks in the order of their relative magnitudes, thus reducing the data rate while still retaining the most useful information, and reads out the measures taken in a format adaptable to digital computer input.

(4) Implementation of the analyzer in its preferred embodiment is basically modular, so that the level of information obtained and the resulting data rate may be controlled by addition or subtraction of modules.

Brief description of the drawings

The invention will be further understood and its various objects, features and advantages more fully appreciated by reference to the appended claims and the following detailed description when read in conjunction with the accompanying drawings, wherein:

Description of preferred embodiments

Figures 1, 2, 4:
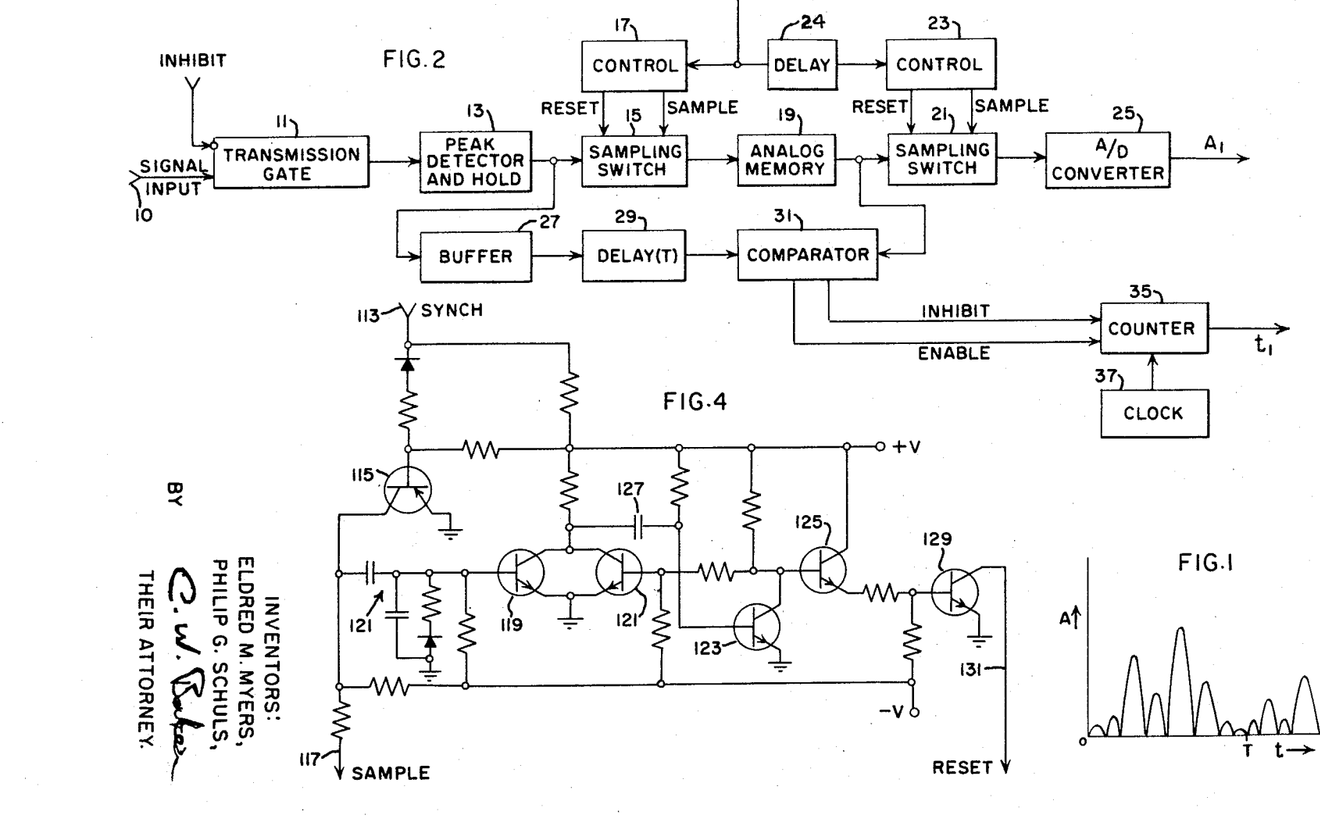
FIGURE 1 illustrates a typical signal input to the waveform analyzer of this invention.
FIGURE 2 is a block diagram of a waveform analyzer in accordance with the invention, providing measures of the magnitude and occurrence time of the highest amplitude peak during each waveform sampling period.
FIGURE 4 is a schematic of these control circuits.

With continued reference to the drawings, wherein like reference numerals have been used throughout to designate like elements, FIGURE 1 illustrates a signal waveform typical of those constituting inputs to the waveform analyzer of this invention. The waveform shown comprises a series of pulses or amplitude peaks spaced along the time axis and divisible into waveform sampling periods of duration T. These periods may conveniently be of equal time length, and division into them may be either arbitrary or in predetermined relation to some characteristic or parameter of the signal being analyzed, such as radar pulse or pulse train length in the case of radar, for example. In some applications requiring signal frequency analysis, the input waveform may comprise a frequency spectrum repetitive along the time axis in FIGURE 1, and here the spectrum width determines the duration of the waveform sampling period.

Waveforms having these characteristics are frequently encountered in radar signal processing, and are typical of the output signals produced by frequency scanning filter arrangements such as that described in U.S. Patent No. 3,026,475 to Applebaum, for example. The high speed of the serial analog processing performed by this Applebaum and like signal processors often precludes direct computer analysis of their serial outputs, because the extremely high data rate which would result if this output simply were directly converted to digital form could be accommodated only by very high capacity computers and peripheral equipment. If every element of information contained in the analog signal output must be preserved, then of course data rate reduction is not possible. However, in many cases and particularly in radar signal processing, little useful information may be included in the lower amplitude peaks and an acceptable level of information may be obtained by selecting for measurement only some relatively small number of the highest amplitude peaks, thus accomplishing a corresponding data rate reduction while retaining the most useful information.

The waveform analyzer of the present invention may serve in this fashion to provide measures of magnitude and occurrence time for some selected number of amplitude peaks occurring during each waveform sampling period, which number may be as small as one or may be so large as to provide measures of every discernible amplitude peak. This latter would give a complete amplitude and time breakdown of the signal, but of course would not be effective to reduce the data rate since the output then would include all information contained in the original signal. In practice, therefore, the waveform analyzer of the invention will normally include some relatively smaller number of amplitude measures, and in many cases this number may be as small as one, two or three. Implementation of the desired level of analysis is facilitated by the modular form in which the basic analyzer circuit of this invention may conveniently be embodied. Each such module extracts measures of the magnitude and occurrence time of one amplitude peak in the waveform input, and in order to extract some number $m$ of amplitude peaks $m$ modules are used with interconnection through certain necessary logic elements as will be described hereinafter.

Figure 7:
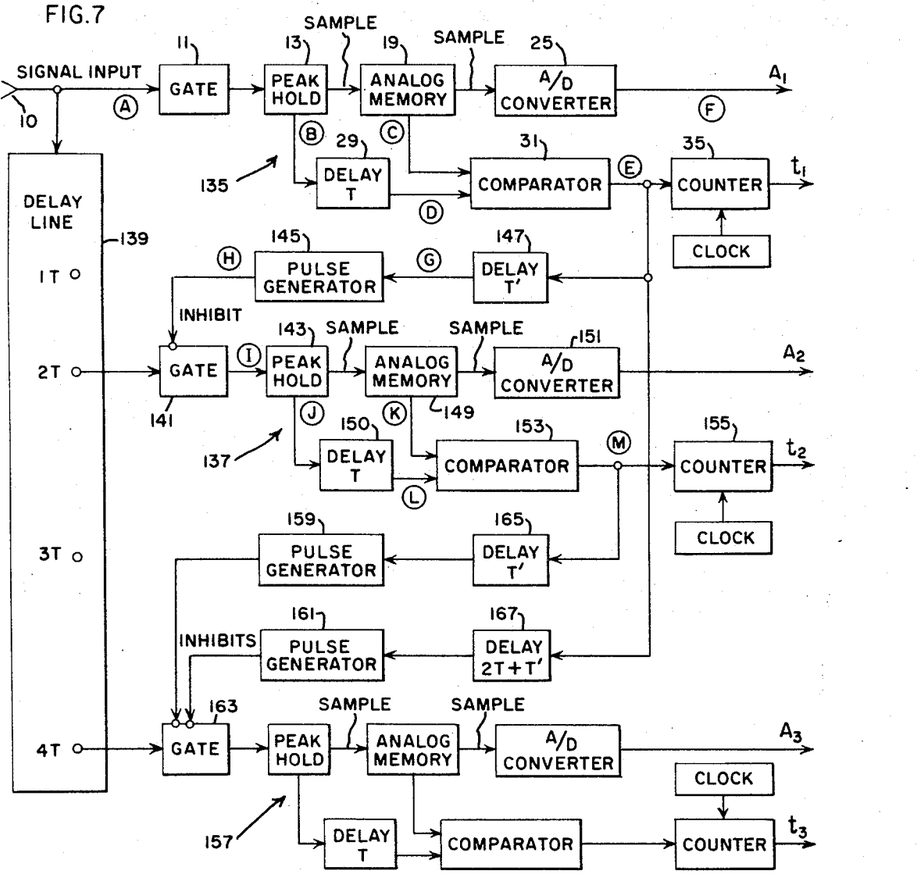
FIGURE 7 is a block diagram of a waveform analyzer arranged in accordance with the invention to provide measures of magnitude and occurrence times of the three highest amplitude peaks occurring during a sampling period, and to provide these measures in digital form and ranked in order of decreasing magnitdue.

The basic module is illustrated in FIGURE 2, and as there shown comprises a transmission gate 11 to which the signal waveform to be analyzed is supplied via input terminal 10, and through which the signal is transmitted to a peak detector and hold circuit 13. As indicated, the transmission gate 11 includes an "inhibit" function which actually is not required in the single stage analyzer module illustrated in FIGURE 2, but since this function is necessary in subsequent stages of multistage or cascaded systems comprising a plurality of these modules interconnected as shown in FIGURE 7, the "inhibit" function may desirably be included in the basic module for standardization purposes even though not used.

The peak detector and hold circuit 13 responds to the input waveform to produce an output signal of instantaneous magnitude which follows the envelope of amplitude peaks in the waveform until the amplitude peak of greatest magnitude is reached, and then holds its output signal constant at that magnitude through the remainder of the waveform sampling period. Toward the end of the sampling period, by which time the output signal from peak detector and hold circuit 13 will correspond in magnitude to the amplitude of the highest peak sensed during that period, a sampling switch 15 is energized by control means 17 in response to a "synch" signal input, to extract a signal of magnitude proportional to the magnitude of the highest amplitude peak, sensed by the peak detector during the sampling period. This signal is transmitted to and stored in an analog memory 19 through the next following sampling period.

A second sampling switch 21, operating in response to a "sample" signal generated by control 23 at a point in time delayed with respect to the "sample" signal to sampling switch 15 by a delay element 24 interposed in the connection of control 23 to the "synch" signal input, samples the stored peak amplitude signal in analog memory 19 and produces an output signal proportional in magnitude to it. This output signal provides the desired measure of the magnitude of the highest amplitude peak in the waveform under analysis. Such signal is of course in analog form, and to obtain an output $A_1$ in the desired digital format the signal is processed through an analog-to-digital converter 25 which may be of conventional type.

To obtain a measure of the point in time at which this amplitude peak occurs, the output of the peak detector and hold circuit 13, which it will be recalled is a signal of magnitude conforming to the envelope of the amplitude peaks up to and including that of greatest magnitude and thereafter of constant level corresponding to the magnitude of that peak, is transmitted through a buffer 27 and through a delay element 29 to provide one input to a comparator 31. The delay element 29 is effective to delay the signal as transmitted through it, by a time interval just equal to the waveform sampling period, so that this signal as transmitted to comparator 31 is a precise replica of that generated by the peak detector and hold circuit but is delayed with respect thereto by one waveform sampling period. The second input to comparator 31 is supplied from the analog memory 19, which it will be recalled stores a signal obtained through sampling switch 15, of constant magnitude proportional to the magnitude of the greatest amplitude peak occurring during the next preceding waveform sampling period. The comparator 31 operates to compare the peak envelope signal supplied to it through delay 29 against the peak magnitude signal supplied from analog memory 19, and at the point in time at which these two signals coincide in magnitude the comparator will produce an output thus providing a measure of the time of occurrence of the amplitude peak within the waveform sampling period.

This time measure may conveniently be obtained, as shown in FIGURE 2, by a counter 35 arranged to provide a digital output in the form of a clock pulse count. The clock pulses to be counted are supplied by a clock 37, with the pulse count commencing on reception of an "enable" signal from comparator 31 to the counter 35, and ceasing on reception of an "inhibit" signal. The rising edge of the "inhibit" signal is generated by the comparator at the moment in time when it senses the coincidence of magnitudes of its two input signals; the rising edge of the "enable" signal is coincident in time with the end or beginning of each waveform sampling period and also is generated by the comparator 31 in the embodiment illustrated. The count run up by counter 35 between the time of coincidence of the two input signals to comparator 31 and the time of beginning of the waveform sampling period, constitutes the desired measure of the time $t_1$ of occurrence of the greatest amplitude peak within the waveform sampling period under consideration.

The waveform analyzer of FIGURE 2 thus serves to provide a digital measure both of the magnitude of the peak amplitude occurring during each waveform sampling period, and of the point in time at which that peak occurs. Since these measures of peak magnitude and time are completed once each waveform sampling period there are no gaps between measurement cycles and no information is lost. To enable such rapid repetition of the measuring process it is necessary that the peak detector and hold circuit 13 and analog memory 19 both be reset at the end of each measurement cycle; this is accomplished by controls 17 and 23 as shown in FIGURE 2. The details of interconnection and operation of these and the other components necessary to achieve the results just explained will best be understood by reference to the more detailed showings of FIGURES 3 and 4, to which reference will now be made.

Figure 3:
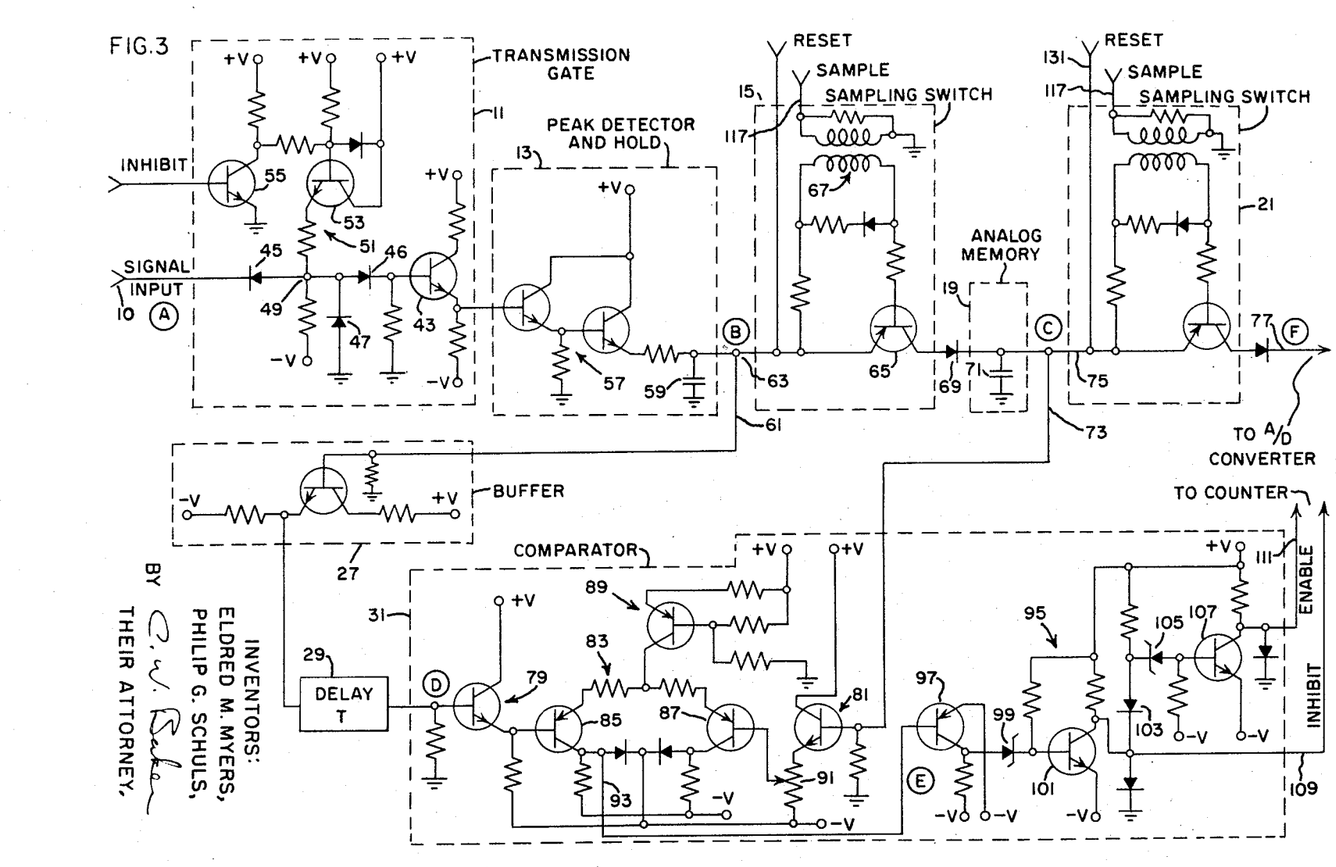
FIGURE 3 is a partial circuit schematic of the waveform analyzer of FIGURE 2 but omitting the sampling and reset control circuits shown in that figure.

In the circuit of FIGURE 3, each of the subcircuits which performs the function of one of the blocks in the diagram of FIGURE 2 is identified by the same legend. As noted in the discussion of FIGURE 2, the "inhibit" function of the transmission gate 11 is not required except in analyzer stages or modules other than the input stage, and is not needed at all if the analyzer comprises but a single stage though even in this case the inclusion of this "inhibit" function may be desired in the interests of standardization. The "inhibit" function accordingly is included in FIGURE 3.

Transmission gate 11 comprises an input terminal 10 to which the waveform to be analyzed is supplied as signal input, and a transistor amplifier stage 43 providing an emitter follower output to the peak detector and hold circuit 13. Input signal transmission to transistor 43 is gated by diodes 45, 46 and 47, which are poled and biased as shown so that signal transmission is either permitted or blocked depending upon the voltage level at their common interconnection point 49. This voltage is in turn dependent upon the operation of the "inhibit" circuit which comprises a two stage inhibit pulse amplifier designated generally by reference numeral 51. A transistor 53 constituting the second stage of this inhibit pulse amplifier is emitter follower connected to the diode common connection point 49, and operates under control of the amplifier input stage 55 in a manner such that an "inhibit" pulse arriving at 55 turns the transistor 53 off, which action results in a change in voltage level at point 49 effective to back-bias the diode 45 and thereby inhibit the signal input at 49 for the duration of the "inhibit" pulse input. The origin and form of these inhibit pulses will be described later.

The peak detector and hold circuit 13 comprises a transistor pair 57 which is Darlington connected and provides an emitter follower output to a memory capacitor 59. This Darlington peak voltage detector operates in a well known manner to charge memory capacitor 59 to the peak voltage of the incoming signal, after which the emitter follower becomes back-biased and the voltage on the memory capacitor holds constant at the peak value to which charged. With low leakage transistors, such as silicon planar transistors, the decay of the signal stored in capacitor 59 will be negligibly small for the desired storage period. The charge voltage on capacitor 59 accordingly will follow the envelope of amplitude peaks in the input signal waveform until the amplitude peak of greatest magnitude is reached, and thereafter will hold at constant voltage until reset.

The peak hold signal on memory capacitor 59 is transmitted via lead 61 to the comparator circuit 31 to be described, and via lead 63 to sampling switch 15. This switch comprises a switching transistor 65 which operates under control of a pulse transformer 67 to which the "sample" control pulse is supplied by control means such as shown in FIGURE 4, which will be described hereinafter by reference to that figure, and transmits a sample of this peak hold signal through a coupling diode 69 to the analog memory 19. Sampling switch 15 also comprises a "reset" input to which a reset signal is supplied by the control circuit of FIGURE 4, and which responds to such reset signal to short the peak hold memory capacitor 59 to ground, thus cancelling the stored signal therein by discharge of the stored energy to ground. The timing of these "sample" and "reset" signals will be discussed in greater detail hereinafter; it will suffice here to note that the sampling signal is timed to occur at or near the end of each of the waveform sampling periods so that the highest amplitude peak occurring during that period will be reflected in the signal content of the peak hold memory capacitor 59, and the "reset" signal is timed to occur very shortly after the "sample" signal so as to assure that the memory capacitor 59 will be reset to zero at or near the beginning of the next following waveform sampling period.

As shown, the analog memory 19 may consist simply of a capacitor 71 which is charged to a voltage level corresponding to the peak hold signal, and holds at that level until reset. Decay of this stored signal in analog memory 19 is minimized by inclusion of a low leakage diode 69 in its charging circuit, and by exercising care to assure that the loads to which its output signal is supplied are of high impedance. These outputs are by way of a lead 73 providing a second signal input to the comparator 31 as will be explained, and by way of a lead 75 to a second sampling switch 21 by which the stored signal may be sampled and transmitted to an analog-to-digital converter providing the desired digital output reading of peak signal amplitude. Sampling switch 21 also includes a "reset" signal input; the timing of this "reset" signal and of the "sample" signal will be discussed in detail hereinafter; again it will suffice here to note that the analog memory sample may be taken at any point during the waveform sampling period subsequent to peak hold sampling by the first sampling switch 15, and the analog memory "reset" signal then may follow its "sample" signal at any desired point in time during the waveform sampling period. It will be noted that this second sampling switch 21 is similar in construction to the switch 15 previously described and operates in similar manner in response to signals supplied by the control circuits of FIGURE 4 as will later be described.

The output signal from the peak hold circuit 13 carried on lead 61 is transmitted to the comparator 31 through buffer circuit 27. This buffer may be of any desired circuit configuration providing very high input impedance, as this is necessary to minimize leakage of the charge stored in the capacitor 59 used as the signal storage element in peak hold circuit 13. The peak hold signal as transmitted to comparator 31 is delayed by a delay element 29 for a time period of duration just equal to the waveform sampling period, to thus place this signal in time juxtaposition with the signal supplied from analog memory 19, which it will be recalled samples and stores its signal just prior to the end of the waveform sampling period and so effectively lags the peak hold signal waveform by one sampling period.

Figure 5:
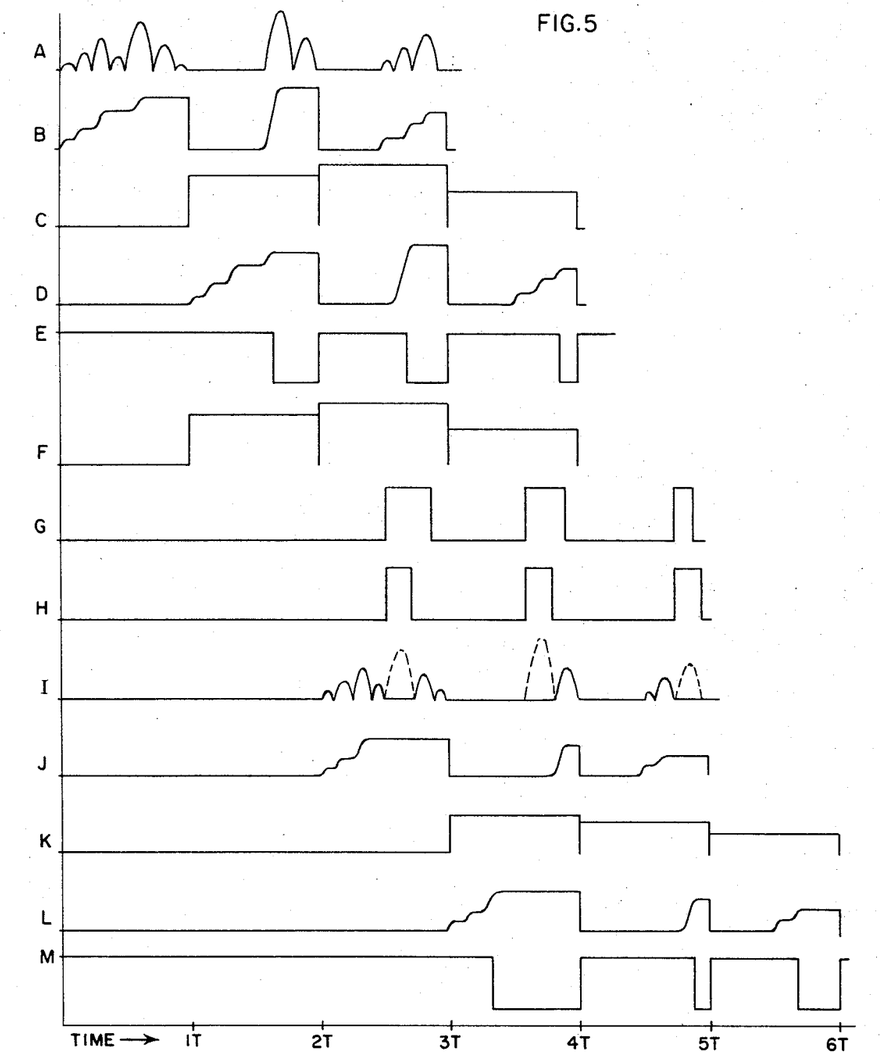
FIGURE 5 illustrates a series of waveforms characteristic of those existing in the waveform analyzer of FIGURES 1 and 7 at the points indicated by the letters A–M in those figures.

The relationship between these respective inputs to the comparator 31 may perhaps be most easily understood by reference to the waveform diagrams of FIGURE 5, and specifically to waveforms A, B, C, D, E and F in FIGURE 5 which occur at the correspondingly identified points in the circuit of FIGURE 3. Waveform A illustrates a representative input signal comprising a series of pulsed waves divisible into waveform sampling periods of equal duration T as indicated by the time markers 1T, 2T, 3T . . . , such division into sampling periods being accomplished either arbitrarily or on the basis of some signal characteristic such as pulse resolution in the case of radar. Waveform B illustrates the action of the peak detector and hold circuit 13 in charging the memory capacitor 59 to a voltage level conforming to the envelope of the amplitude peaks in the input waveform during each sampling period, and then holding the highest signal voltage thus achieved through the remainder of the waveform sampling period, at which time the memory capacitor 59 is reset to zero by the sampling and reset switch 15. This waveform B is that which is transmitted to the delay element 29 via lead 61, and after delay therein it becomes waveform D and is transmitted on as one of the two inputs to the comparator 31.

Waveform C illustrates the action of the sampling switch 15 and analog memory 19. This waveform will be seen to correspond in magnitude to the peak amplitude of waveform B, such relationship being established by virtue of the fact that the waveform B voltage from which waveform C is derived is sampled at a moment in time just prior to the end of the waveform sampling period, so that waveform B is sensed at its maximum amplitude point for each waveform sampling period. The sampled signal thus supplied to analog memory 19 is stored by the memory through the next following waveform period, at which time the analog memory is reset by the sampling switch 21 in preparation for receiving the sampled peak detector and hold signal for the next following waveform sampling period. Waveform C as stored in memory 19 constitutes the second input to comparator 31, and as sampled through sampling switch 21 provides the A/D converter input in the form of waveform F.

Figure 6:
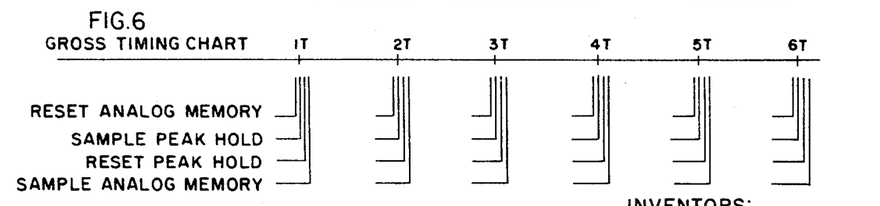
FIGURE 6 is a gross timing diagram illustrating the timing of operation of the control circuits of FIGURE 4.

FIGURE 6 illustrates more clearly the time relationship necessary between the several sample and reset operations of the switches 15 and 21 in order that the waveform have the characteristics just described. As will be evident, the waveform sampling periods are designated in FIGURE 6 with the same numbered time periods 1T, 2T . . . as in FIGURE 5, and within each of these time periods the sequence of reset and sample operations is as indicated by the time markers. First, the peak hold memory capacitor 59 is sampled through sampling switch 15, this preferably occurring at or near the beginning of the reference sampling period as indicated by the "SAMPLE PEAK HOLD" marker. This reads into the analog memory 19 a signal representative of the peak magnitude of the highest amplitude peak in the waveform during the sampling period next preceding the reference period. Note that the operation is cyclic and the analog memory 19 has been reset to zero prior to the beginning of the reference sampling period as will be explained herein. Very shortly after the peak hold signal is read into the analog memory 19, the peak hold circuit 13 is reset to zero. This occurs at the time indicated by the "RESET PEAK HOLD" marker, clearing the memory capacitor 59 so as to enable the detector 57 to supply to it a signal corresponding to the peak amplitude of the input waveform during the reference sampling period. During this time the analog memory 19 continues to store the peak hold signal and at any time during the reference period the analog memory may be read out to the analog-to-digital converter via switch 21, as indicated in FIGURE 6 by the "SAMPLE ANALOG MEMORY" marker. Then, just prior to the end of the reference period, the analog memory is reset as indicated by the "RESET ANALOG MEMORY" marker. This time sequence will result in waveforms as illustrated in waveforms B and C.

Comparator 31 accepts as its two inputs waveform C and waveform B, after conversion of this latter to waveform D by action of delay element 29, and produces an output transition at the moment in time at which waveform D reaches a voltage level equal to or greater than that of waveform C. The comparator 31 comprises a pair of emitter followers 79 and 81 each connected to receive one of the two signal inputs from leads 61 and 73, and to supply an output signal to one input of a differential amplifier designated generally by reference numeral 83. This differential amplifier comprises transistors 85 and 87 connected in emitter coupled configuration and provided with a constant current source, designated generally by reference numeral 89, which serves to optimize common mode rejection in generally conventional fashion. The level of signal input to transistor 87 is adjustable by a potentiometer 91 to enable setting of the relative levels of signal inputs so that transistor 87 will switch on and 85 off at the moment in time when waveform D rises to and just equals waveform C. At this moment transistor 85 switches off and impresses a negative going pulse on lead 93, which transmits this differential amplifier output signal to a logic circuit 95 comprising a switching transistor 97 to the base of which the signal is applied.

This differential amplifier output signal, shown as waveform E in FIGURE 5, comprises a series of rectangular pulses of equal height but of varying width. The forward edge of each such pulse occurs at the moment during each waveform sampling period at which the amplitude of waveform D just equals that of waveform C, and thus provides a measure of a point in time at which the peak amplitude is reached. The trailing edge of this pulse corresponds to the reset point, i.e., to the end of waveform sampling period. The pulse forward and trailing edges thus together provide the capability for measuring the moment in time during each waveform sampling period at which occurs the highest amplitude peak during that sampling period.

In the logic circuit designated generally by reference numeral 95, the switching transistor 97 to which the differential amplifier signal is applied responds to the forward edge of each applied pulse to produce an output through a thresholding diode 99 to the base of a transistor 101 biased so as to be switched off when transistor 97 is thus switched on. Transistor 101 has its collector coupled through a first diode 103 which serves as a coupling element to a second thresholding diode 105 through which this signal is transmitted to the base of a transistor 107. These transistors 101 and 107 provide "inhibit" and "enable" control signals which are transmitted, by leads 109 and 111 respectively, to time measuring means capable of measuring the time lapse between the "enable" pulse which marks the end of each waveform sampling period and the "inhibit" pulse which marks the point in time during that waveform sampling period when the two signal inputs to the comparator become equal. As mentioned in the discussion of FIGURE 1, such time measurement means conveniently may comprise a counter and clock combination with the counter operative to count clock pulses during time intervals between the "enable"

and "inhibit" signals, and to provide digital output indication of the clock pulse count thus obtained.

As previously explained, it is necessary that the sampling and reset signals to the sampling switches 15 and 21 be properly coordinated with each other and with the waveform sampling period. FIGURE 4 illustrates a circuit capable of providing sample and reset signals to these requirements, in response to a waveform sampling period marker input at the terminal 113 marked "synch." In radar applications, for example, this "synch" input may be constituted by a pulse signal from a range counter, so that each resolvable pulse burst is timed to coincide with a "synch" pulse to the input 113. This provides the necessary correlation with waveform sampling period in the case of a waveform such as shown in FIGURE 1, and in other systems the "synch" signal input may be selected to control the waveform sampling period and the synchronization of operation of the sampling switches 15 and 21 therewith as necessary to meet the specific needs of the particular system involved. Synchronization of the sampling signals to the two switches 15 and 21, as necessary to establish the relationship shown in FIGURE 6 between the times at which the peak hold and analog memories are sampled, is accomplished by connection of one of the switch control circuits to their common "synch" signal input through delay means such as shown at 24 in FIGURE 1. Synchronization of the sampling and reset signals for each switch is accomplished within the individual switch control as will next be explained.

The "synch" signal input to terminal 113 is coupled to the base of a transistor 115 connected in common emitter configuration to provide a signal output on lead 117, this being the "SAMPLE" signal to the sampling subcircuit in switch 15 or switch 21. This signal also is connected to the base input of a transistor 119 through a coupling circuit 121 such that the transistor 119, which normally is biased to off condition, does not respond to the forward edge of the pulse output from transistor 115 but does respond to the trailing edge of this pulse by momentarily triggering the monostable multivibrator constituted by transistors 121 and 123. The multivibrator then transmits an output pulse to an emitter follower connected to transistor 125, this pulse being of fixed duration controlled by the timing capacitor 127 which determines the time the multivibrator will remain in its unstable state when triggered into that state by switching on of transistor 119 in response to the "synch" signal input to terminal 113. The duration of this multivibrator output pulse determines the length of time delay between the "sample" and "reset" signal outputs, which it will be recalled differs for the peak hold and analog memory sampling switches as explained in the discussion of FIGURE 6. The "reset" pulse output from transistor 125 controls a switching transistor 129 operative when switched on to connect to ground the memory capacitor 59 in the peak detector and hold circuit 13 or the memory capacitor 71 in analog memory 19, to thus discharge the capacitor preparatory to reception of the next waveform sample.

The circuits as thus far described are capable of selecting from the input waveform that amplitude peak which is of greatest magnitude, providing a measure of its magnitude in digital form if desired, and further providing a measure of the point in time during the waveform sampling prior at which this amplitude peak occurred, again providing this measurement output in digital form if desired. These same circuits also constitute a basic module adapted to be connected in cascade relation and when so connected to provide similar measures of amplitude peaks of successively smaller magnitude, in any desired number. FIGURE 7 illustrates the necessary interconnection between modules and the few additional elements necessary to accomplish detection and measurement of amplitude peaks of successively decreasing magnitude, in accordance with the invention.

In FIGURE 7, the first module designated generally by reference numeral 135 may be identical in circuitry and operation to the single stage system already described, though in the interests of simplifying the block diagram the block titles in FIGURE 7 have been abbreviated slightly from the corresponding titles in FIGURE 2. As noted in the discussion of FIGURE 2, no "inhibit" input is necessary to a single stage system. The same is true of the first stage in a multiple stage system such a shown in FIGURE 7, so this first stage 135 need not include any "inhibit" input and none is shown. The second stage module 137 is similar to the first, but receives its input waveform through a delay element which conveniently may take the form of a multitapped delay line 139 providing output taps at descrete time delay intervals each corresponding to one of the waveform sampling periods. The transmission gate 141 through which the second stage module 137 derives its waveform input connects to the 2T tap of delay line 139, which provides to the transmission gate 141 a waveform identical in shape to that at the signal input 10 but delayed in time with respect thereto by a time equal to twice the waveform sampling period.

Gate 141 also receives as a control input the "inhibit" pulse output of a pulse generator 145, which produces this output pulse in response to the counter control pulses produced by comparator 31. These pulses are transmitted to pulse generator 145 through a delay element 147 providing a time delay T' which, for a reason to be explained, is made slightly shorter than the waveform sampling period. Pulse generator 145 may comprise a monostable multivibrator of conventional configuration, providing an output pulse of standardized width and magnitude irrespective of the width of its input pulse, in the manner characteristic of conventional monostable multivibrator operation.

The operation and interaction of pulse generator 145 and delay element 147 with gate 141 may perhaps best be understood by reference to the waveforms of FIGURES 5 and 6. With specific reference to waveforms E, G and H, it will be recalled that waveform E is the output of comparator 31 and is constituted by pulses the forward edge of each of which coincides with the time during each waveform sampling period at which the input waveform equals in magnitude its highest amplitude peak, the signal comparison resulting in waveform E being accomplished at a point in time delayed by one waveform sampling period. This waveform E is again delayed by delay element 147 for a time period slightly less than the waveform sampling period and as transmitted on to the pulse generator 145 corresponds to waveform G, which is of the same shape as waveform E but delayed with respect thereto. The magnitude of the difference between this time delay period and the waveform sampling period may be made equal to one-half the desired width of the "inhibit" pulse which is to be produced by the pulse generator 145, and this in turn is selected to be approximately equal to the average base width of the amplitude peaks in the input waveform A. The reason for this and the manner in which pulse width selection is accomplished will become more fully apparent as the description of the "inhibit" function proceeds.

An "inhibit" pulse input to transmission gate 141 operates to block this gate and to prevent transmission of signals therethrough, this being accomplished by transistors 53 and 55 in the "inhibit" circuit 51 of FIGURE 3. With gate 141 thus blocked, the signal input at terminal 10 after delay through two waveform sampling periods in the delay element 139, will be transmitted by gate 141 to the peak hold circuit 143 continuously except during any period of time when an "inhibit" pulse is applied to it by pulse generator 145. The time relationship established by the various delay and other circuit elements are such that the "inhibit" pulse coincides in time with the highest amplitude peak during the preceding waveform sampling period and thus blocks the transmission of this highest amplitude peak to the peak detecting and hold circuit, but passes to it the remainder of the input waveform. Thus, in FIGURE 5, the "inhibit" pulses of waveform H for each waveform sampling period may be seen to be in time coincidence with and approximately equal in base width to the highest amplitude peak ocurring during that same waveform sampling period in the delayed input signal as represented by waveform 1. The "inhibit" pulse width is controlled by the timing element in the monostable multivibrator which constitutes pulse generator 145, and it is centered over the amplitude peak to be inhibited by setting the delay T' introduced by element 147 shorter than the waveform sampling period by an amount equal to one-half the "inhibit" pulse width.

Since the highest amplitude peak during each waveform period thus is blocked against transmission to the peak hold circuit 143, the peak hold circuit does not respond to this one peak but instead produces an output waveform—waveform J in FIGURE 5—which follows the envelope of amplitude peaks but excepts and does not respond to that of the highest amplitude, since that one and that one only is not transmitted to it. The peak detector output waveform J then is sampled and processed on through the analog memory 149 to the analog-to-digital converter 151 to provide an amplitude measure of this second largest peak in precisely the same way as provided for the highest amplitude peak in the first stage module. Similarly, signals supplied to the comparator 153 in this second stage module control a second counter 155 providing the desired measurement of the time of occurrence of this second largest amplitude peak.

The output signal from analog memory 149 is shown as waveform K and is similar in form to waveform C except that it is time displaced by two sampling periods and is of magnitude proportional to the second highest amplitude peak in the original input waveform rather than to the first highest peak. Waveform J is delayed in delay element 150 by one sampling period to produce waveform L, and waveforms K and L then are compared by comparator 153 to produce an output waveform M providing a measure of time of occurrence of the second highest amplitude peak in the input waveform, in the same manner as waveform E provides this readout for the highest amplitude peak.

Operation of the third stage module designated generally by reference numeral 157 is generally similar to that of the second stage module, except that since this third stage module is to respond to the third largest amplitude peak it is necessary to block transmission of both the first and second highest amplitude peaks. To accomplish this, two "inhibit" pulse generators 159 and 161 are provided, both connecting to gate 163 to block the gate against transmission of the input waveform during the times of occurrence of the two highest amplitude peaks. Pulse generators 159 and 161 are provided with their respective control pulse inputs through delay elements 165 and 167, respectively, which in turn derive their signal inputs from the comparators 153 and 31, respectively. Delay element 165 provides a time delay T' equal to that provided by delay element 147 in the second stage module and thus of duration less than the waveform sampling period by an amount equal to one-half the desired inhibit pulse width, as previously explained. Delay element 167 provides this same delay T' plus two additional full waveform sampling periods. It will be noted that these respective delays, when added to the delay introduced by time delay elements and other circuit elements preceding the delay elements 165 and 167, places the "inhibit" pulses generated responsive thereto in the fifth waveform sampling period, and to assure time correspondence of these "inhibit" signals with the input waveform on which they are to operate gate 163 takes this input from the 4T terminal of the delay line as shown.

The "inhibit" pulses thus are placed at the proper time to block the transmission to gate 163 of the first and second highest peak amplitudes occurring during the waveform sampling period. The remainder of the input waveform is transmitted by the gate to the peak hold and other module elements which operate on this waveform in the same manner as in the earlier modules, to extract from it a measure of the amplitude and time of occurrence of the next highest amplitude peak, which of course is the third amplitude peak. The digital readout of this measure in indicated by the amplitude measure $A_3$ and by the time measure $t_3$ as shown.

Such successive derivation of measures of peak amplitude magnitudes and occurrence times could theoretically be continued by cascading additional module stages until all discernible peaks in the input waveform were ranked in the order of their respective amplitudes. Of course, if the procedure were carried this far the data rate of the input waveform would not have been reduced and the system would be functioning effectively as an analog-to-digital converter capable of handling very high speed input in real time. However, in most cases the most useful information is contained in some relatively small number of the highest peak amplitudes so that practical values for the number of module stages normally required may be as low as one, two or three.

Also, as will be obvious to those skilled in the art, similar results may be obtained by omitting the delay elements 147 and 165 in FIGURE 7 and compensating by adjustment of the time delays determined by delay element 167 and by the locations along delay line 139 of the taps at which are derived the waveform inputs to all but the first stage measuring circuit. The necessary time coincidence of the "inhibit" pulse input to each succeeding stage with the amplitude peaks measured in all preceding stages must of course be preserved, which requires that the delay line taps be located at points displaced from the 1T, 2T, and like points representing exact multiples of the waveform sampling period, by a time increment equal to T'.

From the foregoing it is believed apparent that the waveform analysis apparatus of this invention provides automatic analysis of amplitude and occurrence time of any desired number of peaks in the input waveform to be analyzed, yielding a digital output of these measurements. The device has particular capability as an interface device between a high speed serial analog processor and a digital computer, and operates to reduce the data rate of the high speed serial analog input while still retaining and transmitting to the computer the most useful information. The waveform need only occur once for its detailed amplitude and time characteristics to be measured, and no display or monitoring of any sort by an operator is needed to accomplish these measurements.

While in this description of the invention only certain presently preferred embodiments have been illustrated and described by way of example, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. Apparatus for analysis of an electrical waveform divisible into sampling periods to derive measures of the magnitude of the greatest amplitude peak occurring during each sampling period and of its time of occurrence within the sampling period, comprising:

peak detector and hold circuit means having supplied as an input thereto the electrical waveform to be analyzed and operative in response to such input to produce an output signal of instantaneous magnitude following the envelope of amplitude peaks to and including the peak of greatest magnitude, and then operative to hold said output signal at constant magnitude through the remainder of the waveform sampling period;

sampling and memory circuit means for sampling the magnitude of the output signal of said peak detector and hold circuit means at or near the end of the waveform sampling period and for storing the sampled signals through the next following waveform sampling period;

delay means connected to receive the output signal of said peak detector and hold circuit and operative to delay said signal for a time substantially equal to the waveform sampling period;

comparator means connected to receive as a first input signal the output signal of said peak detector and hold circuit as delayed by said delay means and connected to receive as a second input signal the stored signal in said memory means, said comparator being responsive to the relative magnitudes of said two signal inputs to produce an output signal at the moment said first signal input becomes equal in magnitude to said second signal input;

means for sensing the magnitude of the stored signal in said memory to thus provide a measure of the magnitude of the greatest amplitude peak occurring in said waveform during the waveform sampling period;

and means for sensing the signal output of said comparator to derive a measure of the time during said waveform sampling period at which occurs said greatest amplitude peak.

2. Waveform analysis apparatus as defined in claim 1 comprising a plurality of said peak detector and hold circuit, memory and sampling circuit, delay, comparator and sensing means arranged in staged relation, and further comprising:

second delay means connected to receive said input waveform and to transmit said waveform on to the peak detector means of each said stage subsequent to the first stage with a time delay of magnitude proportioned to the number of the stage;

transmission gate means interposed between said second delay means and each of said peak detector means to control the transmission thereto of said delayed waveform;

and inhibit means responsive to the signal output of said comparator means of at least one said stage to block the transmission of said delayed input waveform through said gate means to the next succeeding stage during the occurrence in the waveform of the amplitude peak sensed in said one stage.

3. Waveform analysis apparatus as defined in claim 2 wherein there is included a plurality of at least three stages and a like plurality less one of said inhibit means, the inhibit means for each said stage being responsive to the comparator signal output of all preceding stages to block the transmission of said delayed input waveform through said gate means to that stage during the times of occurrence in the waveform of the amplitude peaks sensed in all preceding stages.

4. For analysis of an electrical waveform divisible into sampling periods, apparatus operative to derive measures of the magnitudes and times of occurrence during each such sampling period of a plurality of amplitude peaks ranked in descending order of their respective magnitudes, comprising:

a plurality of measuring stages of number corresponding to the number of amplitude peaks to be measured and each including peak detector and hold means responsive to the waveform input to that stage to produce an output signal of instantaneous magnitude following the envelope of amplitude peaks to and including the highest peak and then holding at constant magnitude through the rest of the sampling period, sampling and memory means for sampling said peak hold output signal at or near the end of the sampling period and storing the signal thus sampled through the next such period, first delay means receiving said peak hold output signal and operative to delay said signal for a time of approximately the same duration as the sampling period, comparator means connected to receive as a first input the peak hold output signal as delayed by said delay means and connected to receive as a second input the stored signal in said memory means, said comparator being responsive to the relative magnitudes of said two inputs to produce an output signal at the moment said first input approximates in magnitude said second input, means for sensing the magnitude of the stored signal in said memory to thus provide a measure of the magnitude of the greatest amplitude peak occurring during the sampling period, and means responsive to the signal output of said comparator to derive a measure of the time during the sampling period when that amplitude peak occurs;

second delay means receiving said input waveform for transmission to said peak detector and hold means of each said stage subsequent to the first with a time delay proportioned to the sampling period and to the remoteness from said first stage of the stage to which transmission is made;

transmission gate means interposed between said second delay means and said peak detector and hold means and operative in response to an inhibit pulse input to block transmission of the delayed waveform to said peak detector and hold means of each said stage subsequent to the first;

and pulse generator means responsive to the comparator output signals of each said stage preceding the last to produce inhibit pulses operative on said gate means to block transmission therethrough of the input waveform to each said stage subsequent to the first during the times of occurrence in the waveform of all amplitude peaks sensed in the preceding stages.

5. Waveform analysis apparatus as defined in claim 4 wherein said inhibit pulse generator means comprises multivibrator means triggered by said comparator output signal to produce pulses of width approximately equal to the average base width of the amplitude peaks to be blocked and in time coincidence therewith.

6. Waveform analysis apparatus as defined in claim 5 further comprising third delay means through which said comparator output signal to said multivibrator means is subjected to a delay period approximately equal to the waveform sampling period less one-half the desired pulse width.

7. Waveform analysis apparatus as defined in claim 4 wherein said second delay means comprises a delay line tapped at points providing time delays proportioned to multiples of said waveform sampling period.

References Cited

UNITED STATES PATENTS 3,209,256   9/1965   Slawsky.

RODNEY D. BENNETT, Jr., *Primary Examiner.*

D. C. KAUFMAN, *Assistant Examiner.*